United States Patent Office.

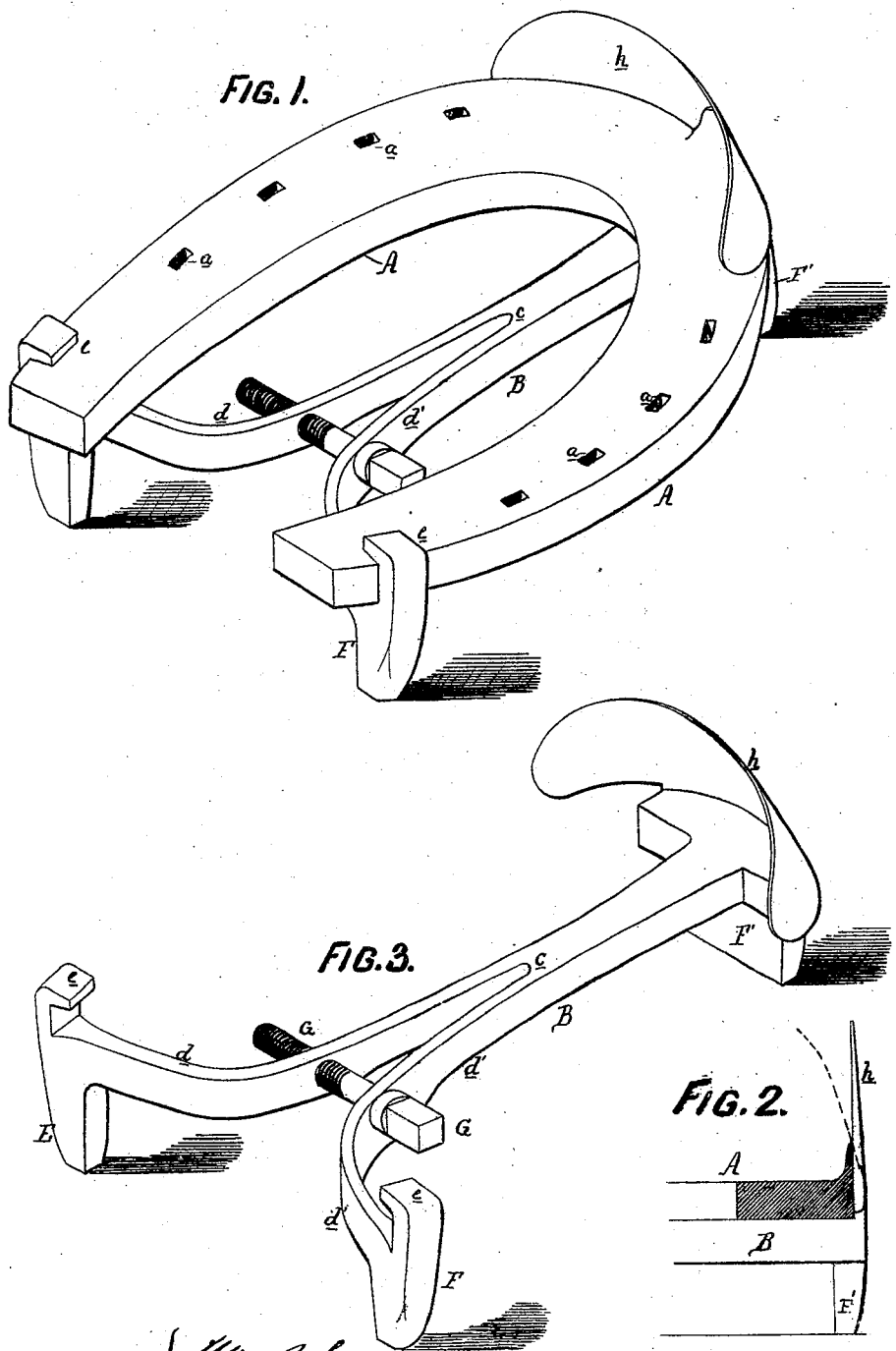

ALBERT L. MURPHY, OF PHILADELPHIA, PENNSYLVANIA.

Letters Patent No. 100,180, dated February 22, 1870.

IMPROVEMENT IN HORSESHOES.

The Schedule referred to in these Letters Patent and making part of the same.

I, ALBERT L. MURPHY, of Philadelphia, county of Philadelphia, State of Pennsylvania, have invented an Improvement in Detachable Calks for Horseshoes, of which the following is a specification.

Nature and Object of my Invention.

My invention consists principally in forming the calks of a horseshoe upon a forked metal bar or frame, which can be readily attached to or detached from the shoe without involving the necessity of removing the latter from the horse's hoof; and My invention also consists in a peculiar method, fully described hereafter, of rigidly attaching the said bar or frame to the shoe.

Description of the Accompanying Drawing.

Figure 1 is a perspective view of a horseshoe with my improvement;

Figure 2, a sectional view of a portion of the same; and

Figure 3, a perspective view of the calks and frame detached from the shoe.

General Description.

The shoe A is perfectly flat upon its under side, and is secured to a horse's hoof in the usual manner by nails passing through the holes $a$.

The calks, instead of being mere projections of the shoe as usual, are secured to or form part of a steel bar or frame B, which is arranged for attachment to the under side of the shoe.

This steel bar is forked at $c$, and its forked ends $d$ and $d'$, of reduced thickness, are bent outward and formed at their extremities into heel-calks F F beneath, and into hooks or lips $e$ $e$ above, these latter passing around and partly embracing the ends of the shoe, as best observed in fig. 1.

The toe-calk F' is formed transversely upon and projects downward from the front end of the bar B, and directly above this calk, and also forming part of the said bar, is a thin plate, $h$, several inches wide, which before being shaped to the hoof, as hereafter described, extends vertically upward, as indicated by the full lines in fig. 3.

The forked ends or arms $d$ and $d'$ of the bar B are sufficiently elastic to admit of being drawn toward each other to a slight extent by means of a square-headed bolt or screw, G, which extends through both of the said arms, as plainly shown in the drawing.

The method of attaching the calks with their connecting frame to the shoe and horse's hoof is as follows:

The bolt G is first loosened by the aid of a suitable wrench, so as to permit the arms $d$ and $d'$ to spring freely apart, the bar being then fitted to or held against the under side of the shoe, and the arms $d$ and $d'$ forced still further apart by a pry or other instrument until their hooked ends or lips $e$ $e$ can be caused to pass partly around and embrace the ends of the shoe, as shown in fig. 1.

The bolt G is next tightened so as to draw the hooked arms or clamps firmly against the opposite sides of the shoe, after which the plate $h$, which forms the fastening in front, is hammered down and rounded so as to adapt it to the exact curve of the front of the shoe and of the hoof of the same, (see dotted lines, fig. 3.)

The calks, when thus attached to the shoe, are as rigid and immovable as though forming part of the same, but they can, by merely loosening the screw G, be quickly detached and replaced by another set after becoming worn, or when, owing to changes of weather and in the condition of the roads, it becomes necessary to employ calks of different lengths and degrees of sharpness.

Ordinarily the calks cannot be changed without removing and replacing the entire shoe, an operation which is attended with more or less risk, which destroys the hoof when frequently repeated, and is a frequent cause of lameness in horses.

All of these objections are effectually overcome by my invention, which has a further advantage, namely, that the bar or frame B, extending across the shoe beneath the hoof, will effectually prevent the clogging or "balling" of the latter when traveling over snowy roads.

The calks also can be temporarily removed at night from the shoes of horses which have a habit of lying down in their stalls, and which consequently incur a risk of injury by the calks.

Claims.

1. Heel and toe-calks F and F', formed upon a single bar or frame, B, when the latter is arranged for ready attachment to or detachment from a horseshoe.

2. The bar or frame B, having elastic forked arms $d$ and $d'$ formed at their extremities into hooks or clamps $e$, arranged to pass around and embrace the opposite sides of a horseshoe, as set forth.

2. The combination with the said elastic arms, connected permanently together at their inner ends, of a tightening-screw, G.

4. The plate $h$, at the front end of the bar or frame B, and connected at its center to the frame, but free at the ends, so that the latter may be bent inward, for the purpose described.

In testimony whereof I have signed my name to this specification in the presence of two subscribing witnesses.

ALBERT L. MURPHY.

Witnesses:
JOHN WHITE,
HARRY SMITH.